March 28, 1939.    J. N. HEINER    2,151,699
CASING FOR TURBINES
Filed July 28, 1938

Inventor
John N. Heiner
By J. Mothershead
Attorney

Patented Mar. 28, 1939

2,151,699

UNITED STATES PATENT OFFICE 2,151,699

CASING FOR TURBINES

John N. Heiner, Bethesda, Md.

Application July 28, 1938, Serial No. 221,749

1 Claim. (Cl. 253—39)

(Granted under the act of March 3, 1883, as amended April 30, 1928; 370 O. G. 757)

The invention described herein may be manufactured and used by or for the Government of the United States for governmental purposes in accordance with the provisions of the act of April 30, 1928 (ch. 460, 45 Stat. L. 467).

This invention relates to casings for turbines.

Turbine casings are usually made of two semicylindrical castings which are bolted together through flanges formed on their longitudinal meeting edges.

Great difficulty is experienced in getting these castings sound so that when the bore of the casing is machined to carry the stationary blading the machined surface is free of blow-holes. In consequence, the production of suitable turbine casings is troublesome and expensive.

This invention has for its object to obviate and correct this disadvantage inherent in cast casings and to provide a turbine casing which is capable of being quickly and accurately machined and free from blemishes and imperfections in the metal and which at the same time is strong, durable and efficient.

To accomplish this, I construct the casing of forgings made up of an inner and an outer casing member, as will now be fully described.

Referring to the accompanying drawing—

Like numerals of reference indicate like parts throughout the two figures, in which 1 indicates the outer casing of the turbine which is a forging having an annular flange 2 at each end thereof, it being understood that this outer casing is provided with the usual chests, ports, and connections for the accommodation of the steam, but which are varied in design and arrangement according to the type of the turbine and which form no part of this invention, and therefore, are not illustrated in the accompanying diagrammatic drawing.

Figure 1:
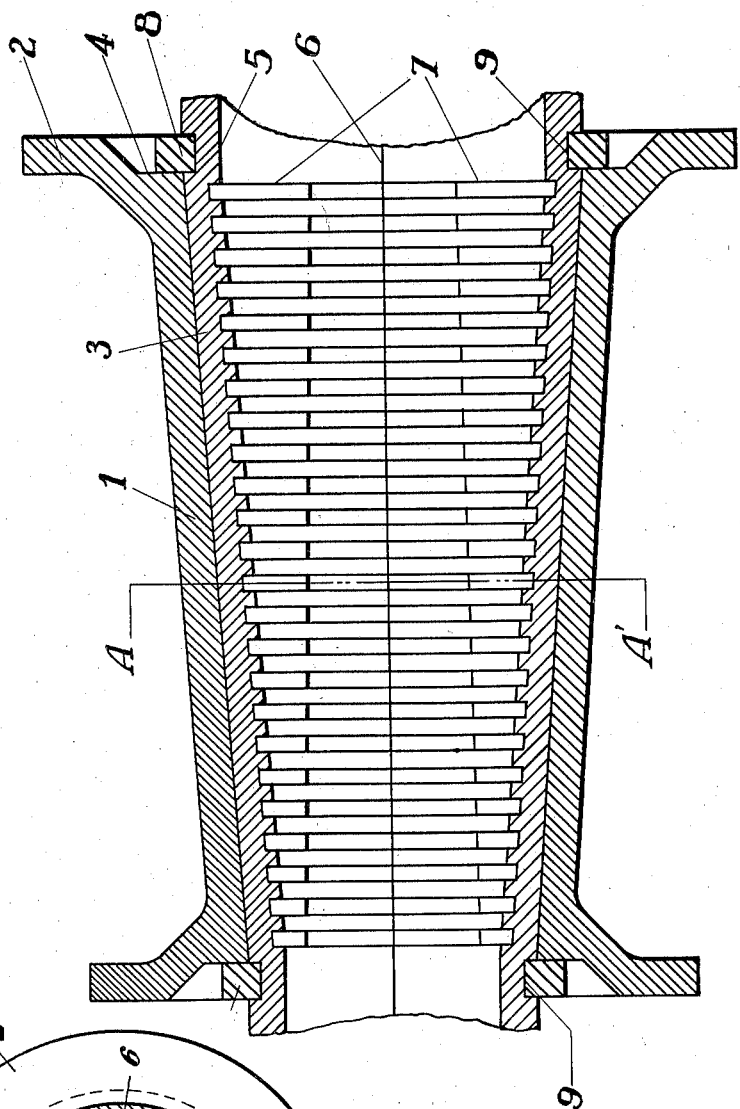
Figure 1 is a diagrammatic vertical longitudinal sectional view through a turbine casing constructed in accordance with this invention.
Figure 2:
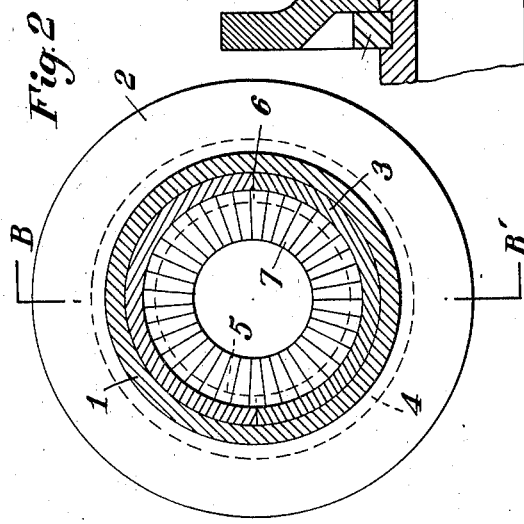
Figure 2 is a vertical transverse sectional view through the casing taken on line A—A of Figure 1.

The interior surface 3 of this outer forged casing is preferably machined on a taper, as shown in Figure 1, while the flanged ends are each recessed at 4 to receive a locking device which will be presently described.

5 indicates the inner casing which is made of a forging preferably split in two parts along a longitudinal line 6. The exterior surfaces of the two parts of the inner casing are machined to fit snugly within the machined outer casing, and the interior surface of the two parts of the inner casing is appropriately machined to carry the stationary blading as shown at 7. The two sections which make up the inner casing are locked in proper operative position at each end within the outer casing in any suitable manner, as by split rings 8 which are set into annular grooves 9 machined in the outer surface of the inner casing, and which lie in the recessed ends 4 of the outer casing.

After the inner casing has been positioned within the outer casing, the end locking rings are applied to the inner casing for the retention of the inner casing, while for the removal of the inner casing, the locking rings are removed, and the inner casing withdrawn from the outer casing.

It is of course understood that the accompanying drawing merely illustrates one example of the construction, and that various changes may be made in the construction and arrangement of the parts without departing from the spirit of the invention. I consider myself clearly entitled to all such changes and modifications as fall within the limit and scope of the appended claim.

What I claim is:

A turbine casing including an outer forged casing member having an annular flange at each end thereof, each flange being provided with an annular recess, the cylindrical bore of the outer casing member being tapered, an inner forged casing member split along a longitudinal line and having its outer surface tapered to fit the tapered interior of the outer casing member and its inner surface appropriately machined to carry the stationary blading and split locking rings at each end of the outer casing member engaging the inner casing member for locking the inner casing member in operative position within the outer casing member.

JOHN N. HEINER.